United States Patent [19]
Giger, Jr. et al.

[11] 3,991,438
[45] Nov. 16, 1976

[54] DOUBLE-RAIL CONVEYOR DESIGN

[75] Inventors: Walter Giger, Jr., Wethersfield, Conn.; Rudy G. Westervelt, Newfield, N.Y.

[73] Assignee: Council of Livestock Protection, Inc., New York, N.Y.

[22] Filed: Oct. 1, 1975

[21] Appl. No.: 618,464

[52] U.S. Cl. .................................. 17/1 A; 17/24; 198/820
[51] Int. Cl.[2] ............................................. A22B 5/00
[58] Field of Search .................. 17/24, 1 A, 44, 14, 17/17; 198/184, 189, 194, 201, 202, 204, 102, 103; 214/21

[56] References Cited
UNITED STATES PATENTS

| | | | |
|---|---|---|---|
| 712,579 | 11/1902 | Nicholson et al. | 17/1 A |
| 2,513,877 | 7/1950 | Kahn et al. | 17/44 |
| 2,747,726 | 5/1956 | Robins | 198/201 |
| 2,751,065 | 6/1956 | Thomson | 198/201 |
| 2,912,715 | 11/1959 | Moss | 17/1 A |

FOREIGN PATENTS OR APPLICATIONS

| | | | |
|---|---|---|---|
| 116,189 | 12/1969 | Denmark | 17/1 A |

*Primary Examiner*—Louis G. Mancene
*Assistant Examiner*—James D. Hamilton
*Attorney, Agent, or Firm*—Moonray Kojima

[57] ABSTRACT

A conveyor system for slaughtering animals comprising a pair of parallel rails disposed to be higher than the leg length of the animal to be slaughtered and located between parallel stationary side walls used to prevent the animal from rolling sideways. On each of the rails flexible conveyor belts are provided. In operation, the animal is placed upright on the pair of rails with its legs straddling the rails. The belts move the animal in the upright position to a slaughtering station.

1 Claim, 7 Drawing Figures

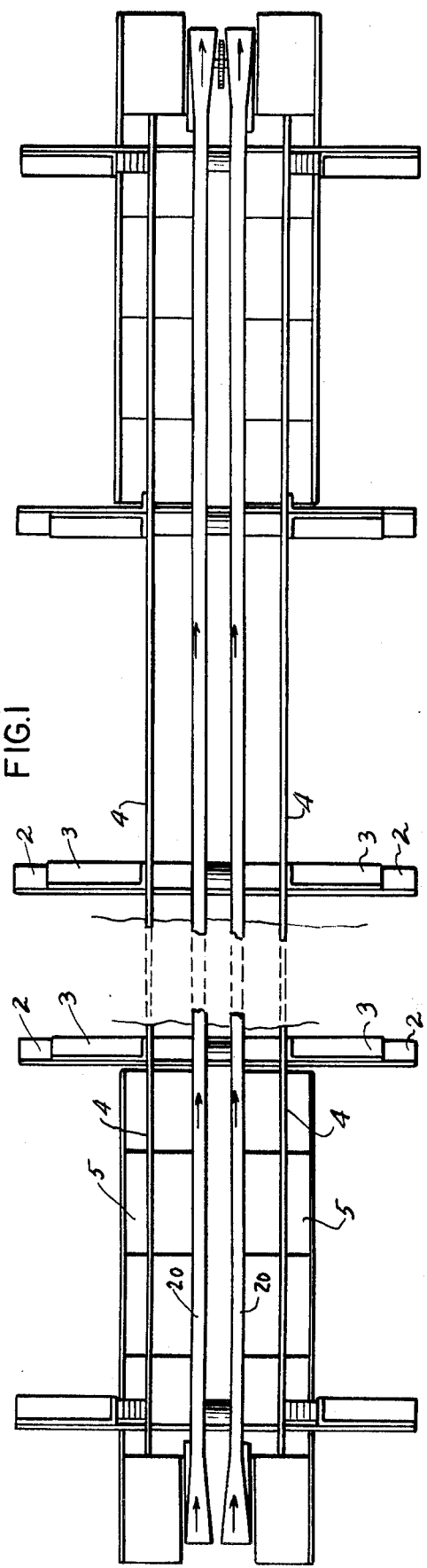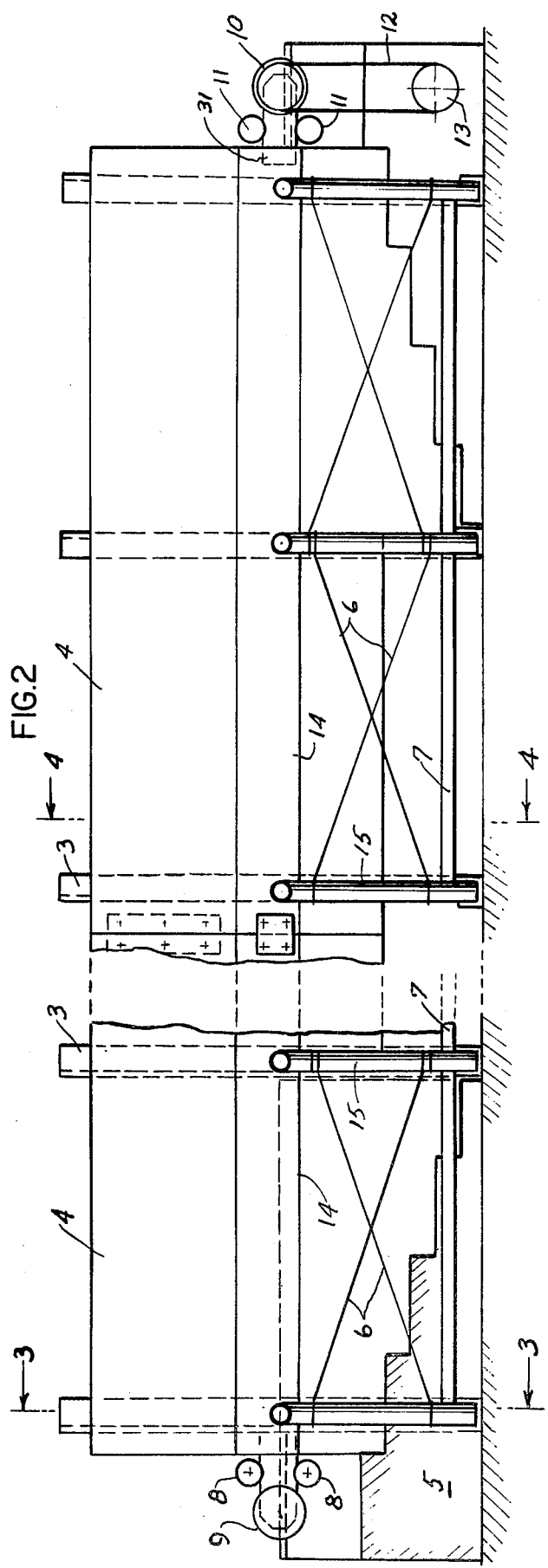

DOUBLE-RAIL CONVEYOR DESIGN

This invention relates to a double rail conveyor system for slaughtering animals.

In copending Pat. application Prince, Balenger, Westervelt Ser. No. 618,483 filed Oct. 1, 1975, filed concurrently herewith and assigned to the same assignee hereof, there is disclosed a yoke having a pair of rails for slaughtering animals. The system employs two parallel bars attached to a frame through which the animal's neck is held with the body on the parallel bars. The slaughter may take place on the bars.

In the present invention, two parallel stationary beams are used with flexible belts positioned on the beams and the animal is placed upright on the beams with its legs straddling the beam and above the floor, and carried by the belts to a slaughtering station. Side walls are provided on either side of the bars to prevent the animal from rolling off.

In one embodiment, the beams have rounded tops and grooves for a chain and at the sides grooves for holding a rope or cable, which may be attached at the edges of the belt. Drive means are provided for driving the chains and hence the belts. Since slaughtering may take place with the animal on the belt, in one embodiment lips are provided about the edges of the belt so foreign matter will not drop into the grooves. Advantageously, the rounded tops of the beam evenly distribute the weight of the animal and provide support therefor.

A feature of the invention is the pair of stationary parallel rails having conveyor belts thereon and disposed a particular distance from the floor for carrying upright animals to be slaughtered with the legs straddling the rails.

A further feature of the invention is the slaughtering of the animals while being in the upright position on the parallel rails.

Another feature of the invention is the pair of stationary beams having rounded tops with grooves therein for placing a continuous chain and guides on either side of each beam for confining ropes or cables and a continuous belt disposed on the beam and driven by the chain and having the ropes attached to the edges for holding the belt on the beams.

A still further feature of the invention is the lips attached to the belt and disposed to be about the side grooves to prevent foreign matter from getting into the side grooves.

The invention will be further illustrated with reference to the drawings in which:

FIG. 1 depicts a top view of an illustrative embodiment of the invention;

FIG. 2 depicts a side view of the embodiment of FIG. 1;

Figure 3:
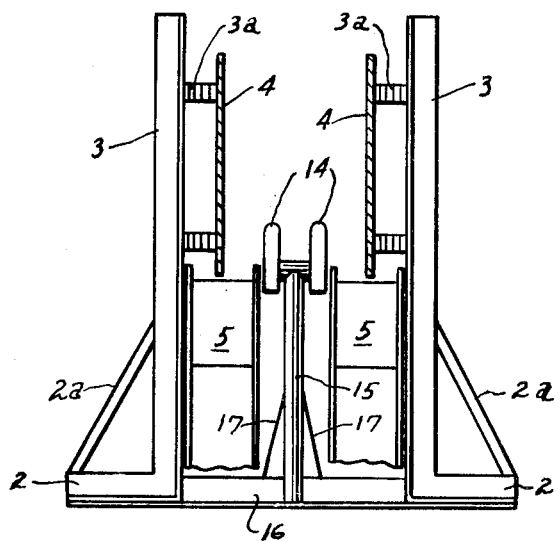
FIG. 3 depicts a sectional end view taken along section lines 3—3.

Turning now to FIGS. 1 and 2, there is depicted a double rail conveyor system of a suitable length and comprising adjustable side walls 4, conveyor belts 20, driven by driving means 10. The belts (not shown in FIG. 2) are positioned on rails 14 in a manner to be described with reference to FIG. 5. Rollers 8 and 11 assist the movement of the belts 20. Drive unit 10 supported by member 31 is driven by belts or chain 12 by motor means 13. The walls 4 are supported by supports 2, 2a, and 3 (See FIGS. 3 and 4) and may be of any suitable material such as ½ inch plywood. The walls may be adjusted vertically and horizontally such as by extension means 3a (see FIG. 3) to adjust the distance between the walls. The support for the double rails 14 may be held by tension rods 6 and compression members 7. At the left end, the belt may be held and guided by idler unit 9. Also located at the left end are descending stairs 5 on which an animal may step down when walking in a standing position onto the rails 14. The stairs may be suitably adjusted for different animals.

Figure 4:
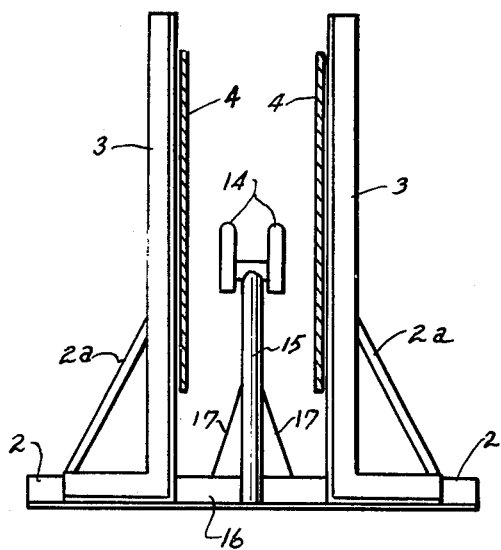
FIG. 4 depicts another sectional end view taken along section lines 4—4.

Turning now to FIGS. 3 and 4, between walls 4 is located double rails 14 supported by member 15 held by angle irons 17 and base 16, and supported by tension rods 6 and compression members 7. The height of the top of the rails 14 can be suitably adjusted to be sufficient to hold the animal to be slaughtered in an upright position with its legs straddling the rails and not touching the floor.

The animal to be slaughtered will travel from the left and be placed on the double rail in an upright position with its legs straddling the rail and off the floor and be conveyed to the right by conveyor belts 20 on rails 14.

Figure 5:
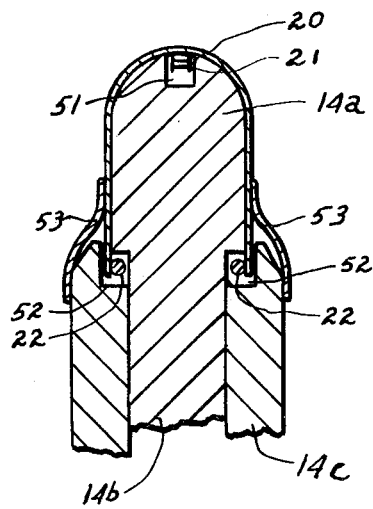
FIG. 5 depicts an arrangement for protecting the rail mechanism from foreign materials.

FIG. 5 depicts the details of the belt and rail arrangement. It was discovered by the inventors that a rounded top of rail 14 is preferred. At the center of top 14a is a groove 51 through which a chain 21 may travel. Belt 20 is designed to fit about rails 14 as shown. The edges of belt 20 have attached thereto ropes or cables 22. The belt 20 is attached by rivets to chain 21. The chain 21 is used for moving the belt, such as by gear 10. The rail 14 may be constructed of a top portion 14a of rounded shape, a lower portion 14b and an outer portion 14 as depicted. To prevent foreign matter, such as blood from the slain animal, from going into the guides 52, flexible covering material 53 may be attached to belt 20 and be positioned as a lip, as shown.

Figure 6:
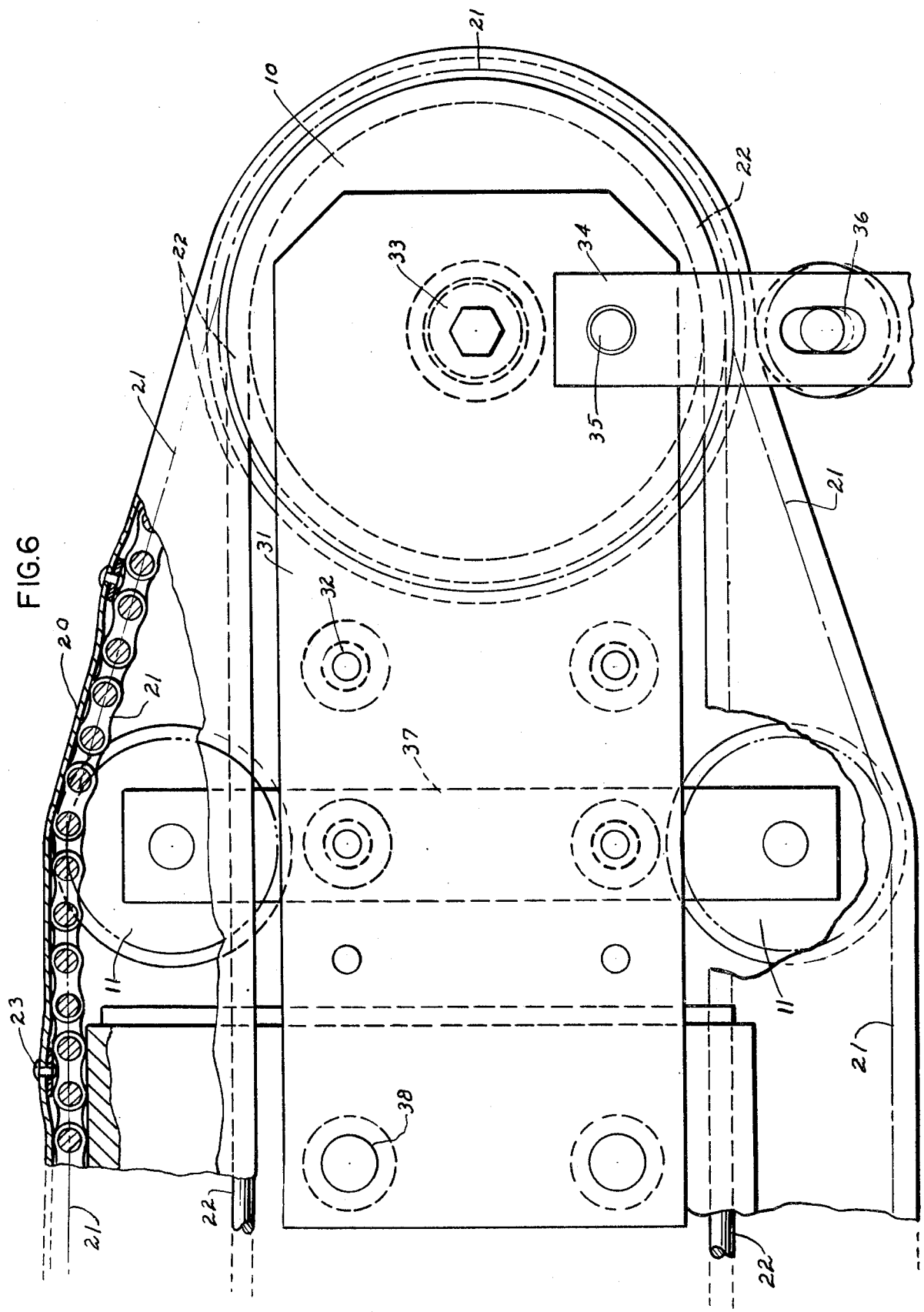
FIG. 6 depicts a side view of the driving mechanism.
Figure 7:
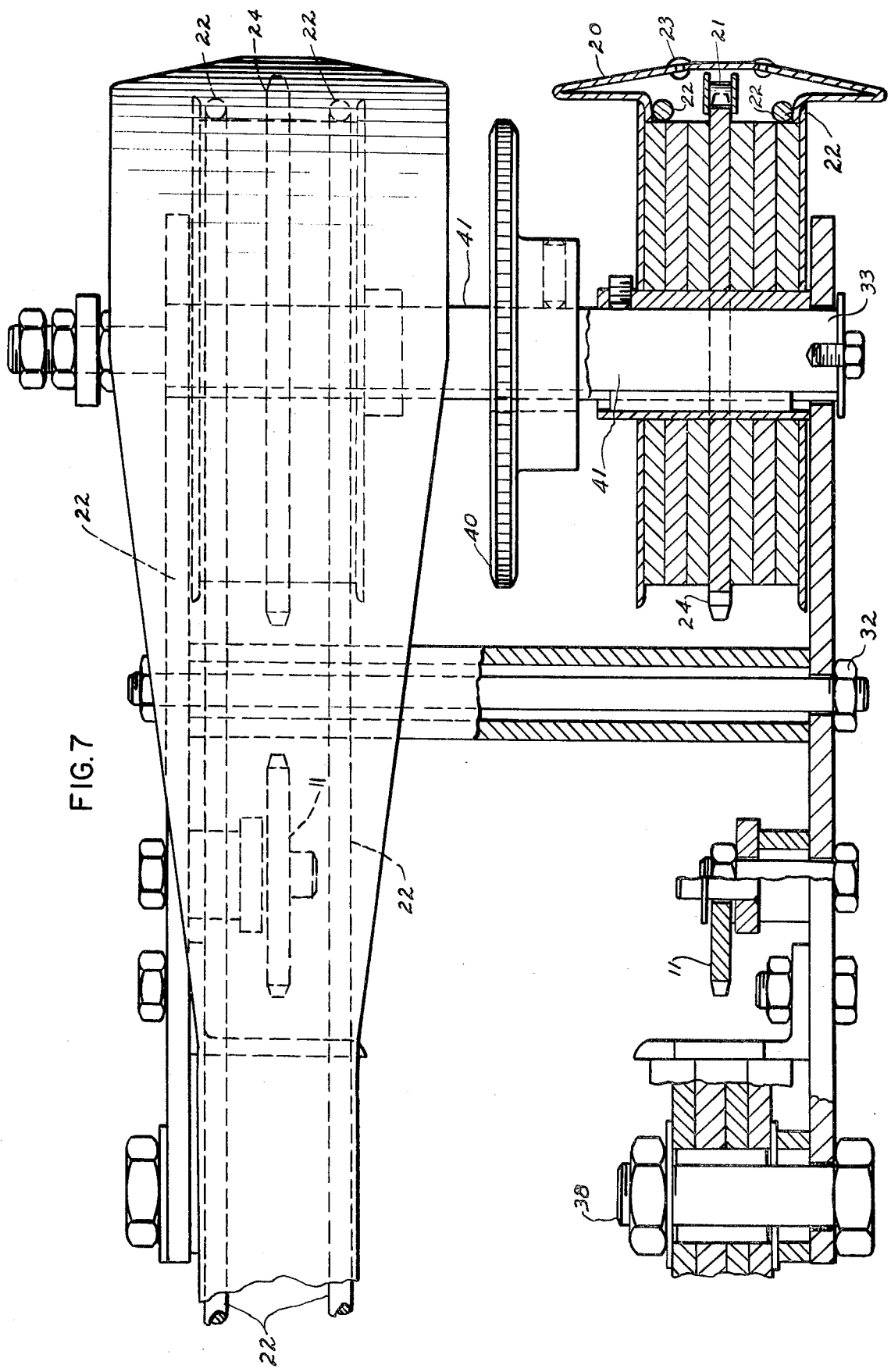
FIG. 7 depicts a partial cutaway top view of the driving mechanism of FIG. 6.

FIGS. 6 and 7 depict in greater detail the drive means located at the right end of the system. Drive wheels or gears 10 having a plurality of teeth 24 is held by bolt unit 33, and plate 31 which are supported on the floor by vertical support 34, held by pin 35 and bolt unit 36. Rollers or wheels 11 are held by plate 37, and are used to support and guide the chain 21. Plates 31 are interconnected by bolts units 32 and 38. As depicted flexible continuous belt 20 is attached by rivet 23 to chain 21 which chain is driven by the teeth 24 of gears 10 (see FIG. 7). Attached to the edges of belt 20 are ropes 22. As shown in FIG. 7, the belt 20 squeezes together at the end gears 9 and 10. The drive wheels 9 and 10 are suitably connected to pass the ropes connected to the edges.

As shown in FIGS. 2 and 7, the drive wheel 10 is driven by motor 13 which transmits the power via chain 12 and gears 40. Gear 40 is connected via shaft 41 to wheel 10 having gear teeth 24 which gear teeth drives the chain 21 and connected belts 20 and ropes 22. The distance between gear teeth 24 of wheel 10 which drives the belt on the two rails 14 may be of any suitable distance, such as 4⅞ inches, with the distance between the outside ends of the rails 14 being, for example, 6⅞ inches, sufficient to hold the animal to be slaughtered such as a lamb or calf.

The foregoing description is illustrative of the principles of the invention. Numerous other variations and modifications thereof would be apparent to the worker skilled in the art. All such variations and modifications are to be considered to be within the spirit and scope of the invention.

What is claimed is:

1. A conveyor system for slaughtering animals in an upright position, comprising support means anchored on a horizontal platform floor;

a pair of parallel rails supported by said support means above said floor at a distance therefrom greater than the length of the legs of said animal so that said animal rests on and in contact with both said rails and supported thereby in an upright position with its legs straddling both said rails and above and at a distance from said floor, said rails being shaped to be round at the top surfaces thereof and extending from a starting station to a slaughtering station;

a pair of stationary vertical side walls located on either side of said rails and at a suitable distance therefrom for preventing said animal from rolling off said rails while being conveyed thereby, said walls extending substantially from said starting station to said slaughtering station;

conveyor means positioned on both said rails and comprising a flexible belt means covering the top surfaces of said rails, a chain means attached to said belt means and disposed within said rails, a pair of lip means attached toward the edges of said belt means to cover said edges, and means attached to the edges of said belt means for aligning said belt means on said rails; and motor means for continuously moving said conveyor means, and comprising gear means located at one end of said conveyor means and motor for driving said gear means, said gear means driving said chain means to drive said belt means, whereby said animal to be slaughtered is moved solely by said belt means in an upright position to said slaughtering station to be slaughtered in said upright position.

* * * * *